United States Patent
Lin et al.

(10) Patent No.: US 7,606,356 B2
(45) Date of Patent: Oct. 20, 2009

(54) METHOD AND SYSTEM FOR IMPLEMENTING CHARGING COMMUNICATION SERVICES

(75) Inventors: Hai Lin, Guangdong (CN); Ke Zhang, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 513 days.

(21) Appl. No.: 10/593,763

(22) PCT Filed: Mar. 22, 2005

(86) PCT No.: PCT/CN2005/000362

§ 371 (c)(1),
(2), (4) Date: Jan. 25, 2007

(87) PCT Pub. No.: WO2005/091558

PCT Pub. Date: Sep. 29, 2005

(65) Prior Publication Data

US 2008/0037739 A1   Feb. 14, 2008

(30) Foreign Application Priority Data

Mar. 24, 2004   (CN) .................... 2004 1 0032101

(51) Int. Cl.
    *H04M 15/00* (2006.01)
(52) U.S. Cl. .................... 379/121.04; 379/114.03; 379/114.06; 379/127.01; 379/127.03
(58) Field of Classification Search .............. 379/111, 379/114.01, 114.03, 114.05, 114.06, 115.01, 379/121.01, 121.04, 127.01, 127.03, 127, 379/127.05
See application file for complete search history.

(56) References Cited

U.S. PATENT DOCUMENTS

| | | | | |
|---|---|---|---|---|
| 6,205,211 | B1 * | 3/2001 | Thomas et al. | 379/114.06 |
| 6,249,573 | B1 * | 6/2001 | Hudson | 379/114.2 |
| 6,487,283 | B2 * | 11/2002 | Thomas et al. | 379/112.01 |
| 7,313,230 | B2 * | 12/2007 | Lu et al. | 379/114.01 |
| 2001/0001000 | A1 * | 5/2001 | Thomas et al. | 370/200 |
| 2008/0065571 | A1 * | 3/2008 | Lu et al. | 705/418 |
| 2008/0090551 | A1 * | 4/2008 | Gidron et al. | 455/406 |

FOREIGN PATENT DOCUMENTS

| | | |
|---|---|---|
| CN | 1355647 | 6/2002 |
| WO | WO 02-052833 | 7/2002 |

* cited by examiner

*Primary Examiner*—Binh K Tieu
(74) *Attorney, Agent, or Firm*—Ladas & Parry LLP

(57) ABSTRACT

A method for implementing charging communication services is provided, wherein, the charging system includes a charging module and an expression analyzer; the charging module first determines a plurality of basic expression factors, and a user configures expressions based on the expression factors; the charging module reads a communication record, obtains the values of the expression factors by analyzing the communication record, and transmits the values of the expression factors to the expression analyzer; the expression analyzer performs the expression operation assigned with the expression factor values and finally returns the operation result to a charging module; and the charging module searches the corresponding charging rate according to the operation result and calculate the fee. This invention makes the configuration of charging rules more flexible and convenient, raising the development possibility of programs, providing quick support for new service demands, unifying the charging policy description, and simplifying the maintenance work.

13 Claims, 2 Drawing Sheets

METHOD AND SYSTEM FOR IMPLEMENTING CHARGING COMMUNICATION SERVICES

FIELD OF THE INVENTION

The present invention relates to the field of communications, and in particular, to a method and system for implementing charging communication services.

BACKGROUND OF THE INVENTION

Along with the launching of new services of the $3^{rd}$ generation digital communications (3G) and the next generation network (NGN), there are great changes in the charging technology of these services, and for a charging system, it is an important issue to find solutions for rapidly supporting the expansion of new services.

Changes in charging services are mainly caused by the alternation of communication scenes. In traditional charging systems, a communication scene's matching logic is usually fixed in charging system's programs, and a new communication scene's matching logic cannot be supported flexibly. In traditional charging methods, according to some critical factors in communication records (e.g., the calling number, called number, and etc.), the communication features (e.g., whether being long-distance, whether being roaming, or/and whether to be forwarded) are determined. And, use such features to match the conditions of the communication scene that have been configured so as to determine the charging rate of a communication and calculate the fees at last. The logic for matching such critical charging factors is fixed in the programs of the charging system. So end users have to select some factors from the given critical factors, combine these selected factors, and match various communication scenes with the combinations of these selected factors to determine a charging rule.

The drawbacks of the traditional charging methods are as follows: usually, the matching logic of the critical factors for the charging of one service is different from that of the charging of another service. In traditional charging methods, the matching logic is fixed in the programs. To support new services' charging rule or charging method, the programs have to be modified, which increases the development costs and delays the introduction of new products. Moreover, the traditional charging methods cannot be extended flexibly, and the program has to be modified to meet even some minor demands of users, which will interrupt the online system, affect the normal operation of the system, and easily cause failures.

SUMMARY

This invention is to overcome the shortcoming of the traditional charging methods that, the charging rules cannot be modified conveniently and extended flexibly, and to provide a method and system for implementing charging of communication services to make the configuration the charging rules more convenient and flexible.

The technical solution in accordance with this invention is as follows:

A method for implementing charging communication services, including:

Step A: determining a plurality of expression factors related with charging, and configuring respectively corresponding expressions for charging rules which correspond to various communication scenes based on the expression factors;

Step B: reading a communication record corresponding to the communication scene, and obtaining the values of the expression factors by analyzing the communication record;

Step C: matching the values of the expression factors to the expressions corresponding to various charging rules, and obtaining an expression matching the values; and Step D: determining a charging rule corresponding to the expression obtained in Step C, and calculating the fees according to the charging rate corresponding to the charging rule.

In Step A, determining a plurality of expression factors related with charging, may include:

determining the expression factors based on the service type of the communication scene.

In the above solution, the expression factors related with charging may include at least one factor of:

calling number, called number, communication time, communication duration, home city of the calling, visited city of the calling, home city of the called, visited city of the called, home province of the calling, visited province of the calling, home province of the called, visited province of the called, home country of the calling, visited country of the calling, home country of the called, visited country of the called.

In Step A, configuring respectively corresponding expressions for the charging rules, may include:

configuring the expressions with the expression factors and operators in accordance with logical syntax rules.

In Step A, configuring respectively corresponding expressions for the charging rules, may further include:

saving the expressions and the charging rules thereof in a way of one-to-one correspondence.

In the above solution, Step C may include:

assigning the values to each of the expressions corresponding to the charging rules, performing the operation of the expressions assigned with expression factors' values, and based on the operation result, determining the expressions, which satisfy the logical relationship after being calculated with the values of the expression factors, as the expressions matching to the expression factors' values.

In Step D, calculating the fees according to the charging rule, may further include: outputting a document of Call Detail Records (CDRs).

The method may further include: modifying expressions corresponding to the charging rules.

The method may further include: configuring new expressions for new charging rules.

In the above solution, determining a plurality of expression factors related with charging, may include: determining the expression factors in accordance with a uniform rule; and configuring respectively corresponding expressions, may include: configuring respectively corresponding expressions in accordance with a uniform rule.

A system for charging communication services, including at least a charging module for calculating fees based on the charging rate corresponding to a charging rule, and further comprising an expression analyzer, wherein:

the charging module is further configured to determine a plurality of the expression factors related with charging, and providing the expression factors for configuring expressions for various charging rules; the charging module is further configured to read a communication record, obtain the values of the expression factors by analyzing the communication record, and provide the values of the expression factors for the expression analyzer; and the expression analyzer is configured to acquire the corresponding expressions for various charging rules, determining the expression matching to the values of the expression factors obtained from the charging module, and returning the charging rule corresponding to the determined expression to the charging module.

The beneficial effect of this invention is that, in this invention, expressions are employed to match communication scenes such that new services' charging could be flexibly supported, and specifically, the primary merits lie in:

1. charging rules may be flexibly set in a charging system, and the real time modification (including adding and deleting) may be carried out to support new charging demands.

As an approach of analyzing expressions is employed, and expressions are configured during the operation of the charging system, it is easy for a user (a maintenance personnel of the charging system) to modify an expression to describe any communication scene such that new demands of charging services could be supported flexibly, which improves the expansibility of the charging system's programs.

Charging policies are described in a uniform way, which improves the expansibility of the program and simplifies the maintenance.

In this invention, expressions comply with a specific syntax rule, and the expression factors provided are configured in advance, so a certain rule can be used in expression configuration by end users. A user has to get an expression according to the combination of the expression factors and operators given by the system. In this way, the description of charging policies is unified. For example, suppose that the charging system provides two factors, VISIT_CODE and OTHER_VISIT_CODE, the maintenance personnel can only describe a local communication with these two factors. The configuration of an expression is like a procedure of a compiler for C language, as there is a unified rule, any expression's meaning can be learned by users, and the given factors are also used to provide new service's supports, simplifying the system maintenance and enhancing the expansibility of the charging system.

DETAILED DESCRIPTION OF PREFERRED EMBODIMENTS

The present invention is hereinafter described in detail with reference to the accompanying figures and exemplary embodiments.

In accordance with this invention, expressions are employed to match communication scenes so as to flexibly support the charging of new services.

Figure 1:
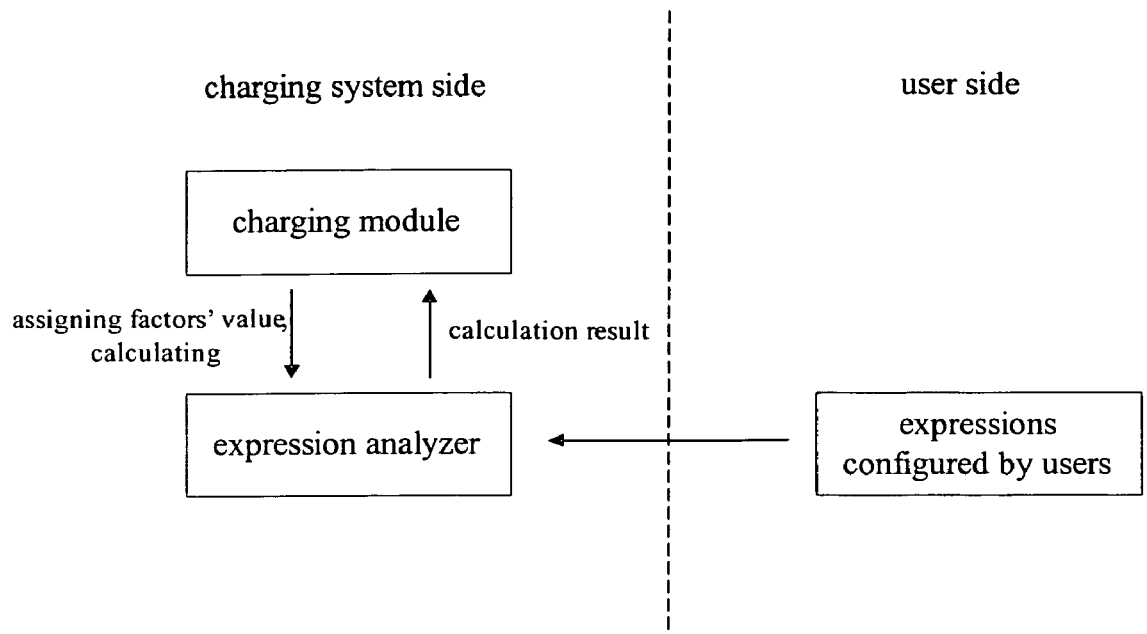
FIG. 1 is a schematic illustrating a principle of a system to an embodiment of the invention.

FIG. 1 is a schematic of a principle of a system to an embodiment of the invention. This system at least includes a charging module for calculating fees based on the charging rate corresponding to a charging rule, and the system further includes an expression analyzer.

The charging module is further used for determining each of the expression factors related with charging, and providing the determined expression factors so as to configure the corresponding expressions for each of the charging rules. This module is further used for reading the current communication record, analyzing the record, obtaining the values of the corresponding expression factors from the record, and providing the values for the expression analyzer;

The expression analyzer is for acquiring the corresponding expressions configured for each charging rule, substituting the values of the expression factors obtained from the charging module in the expressions corresponding to the various charging rules and calculating so as to determine the expression that matches the values of the expression factors, and returning the charging rule corresponding to this expression to the charging module.

Description is hereinafter given to the working principle of this system with reference to FIG. 1:

The charging module first determines some basic expression factors, such as the calling number, called number, time, duration, and etc. A user (e.g., a maintenance personnel of the charging system) configures expressions (mainly refer to logical expressions) based on the given expression factors and saves the expressions. The expressions consist of expression factors and operators which are arranged based on a logical syntax rule. Such expressions are configured when the system is running and can be modified as desired. For different communications, the value of each expression factor may be different. The charging module analyzes each of the expression factors after reading the communication record, and transfers the value of each expression factor to the expression analyzer. The expression analyzer assigns the value of each expression factor transferred from the charging module to the configured expressions, performs the operation of the expressions assigned with the factor values, and returns the operation result to the charging module. The operation result represents the kind of communication scenes that the current communication belongs to. And the charging module searches the corresponding charging rate according to the operation result, and calculates fees.

The charging system lists as many as possible the expression factors related with charging based on different services. For example, the expression factors related with voice services include: the calling number, called number, time, duration, home city of the calling, visited city of the calling, home city of the called, visited city of the called, home province of the calling, visited province of the calling, home province of the called, visited province of the called, home country of the calling, visited country of the calling, home country of the called, visited country of the called, and etc.

The above describes the location of the expression analyzer in the charging system, and a practical example is given below to describe the function of the expression analyzer. The function of an expression includes the following steps: the first one refers to the configuration of an expression, and the second one refers to charging by using expressions.

I The Configuration of an Expression

Figure 2:
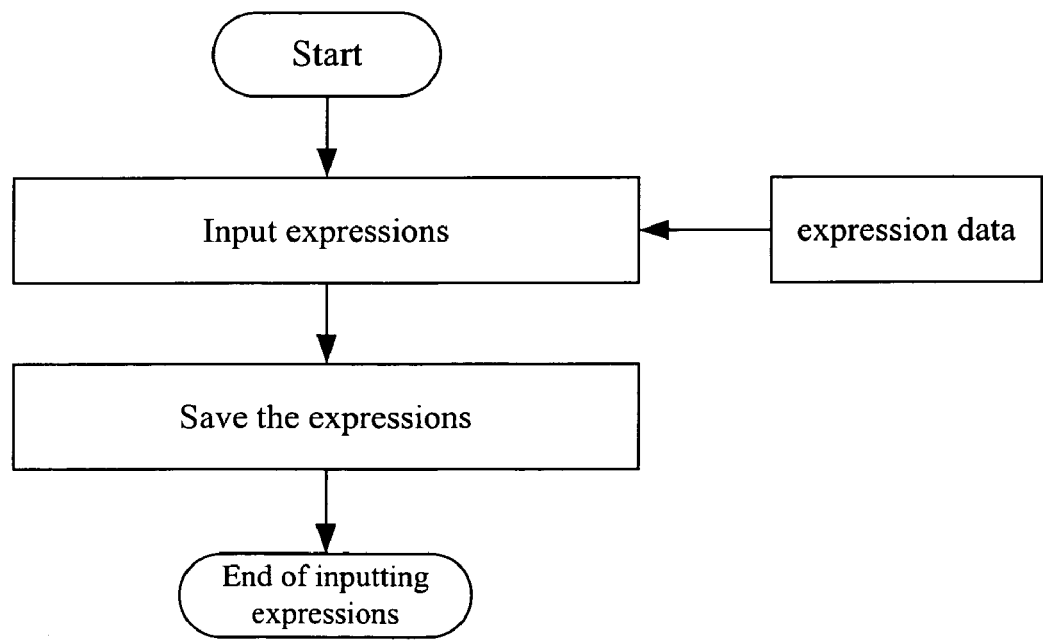
FIG. 2 is a flowchart for configuring an expression in accordance with an embodiment of the invention.

FIG. 2 shows a flowchart for configuring an expression. The expression configuration is usually performed during the operation of the system, including: input an expression for charging based on the practical charging rule, and save the expression (may be saved in a database). For example, a charging rule says that the charging rate for a local communication is 4 cents/minute, and this rule matches a local communication scene. This scene can be described by an expression, e.g., the expression of the local-network communication is described as: VISIT_CODE=OTHER_VISIT_CODE. The communication scene as well as its corresponding charging rule may be saved in a database.

Wherein, VISIT_CODE and OTHER_VISIT_CODE are expression factors defined by the expression analyzer, VISIT_CODE refers to the code of the communication area where this party user is located, and OTHER_VISIT_CODE represents the code of the communication area where the opposite party user is located. The expression of a local-network communication means that the codes of the areas where this party user communicates and where the opposite party user communicates are the same, i.e., the two communication party users calling with each other are located in the same area. Thus, the communication is a kind of local-network communication. In the embodiments of this invention, the configuration of the expression factors and expression itself is implemented by uniform rules.

☐Charging by Using Expressions

Figure 3:
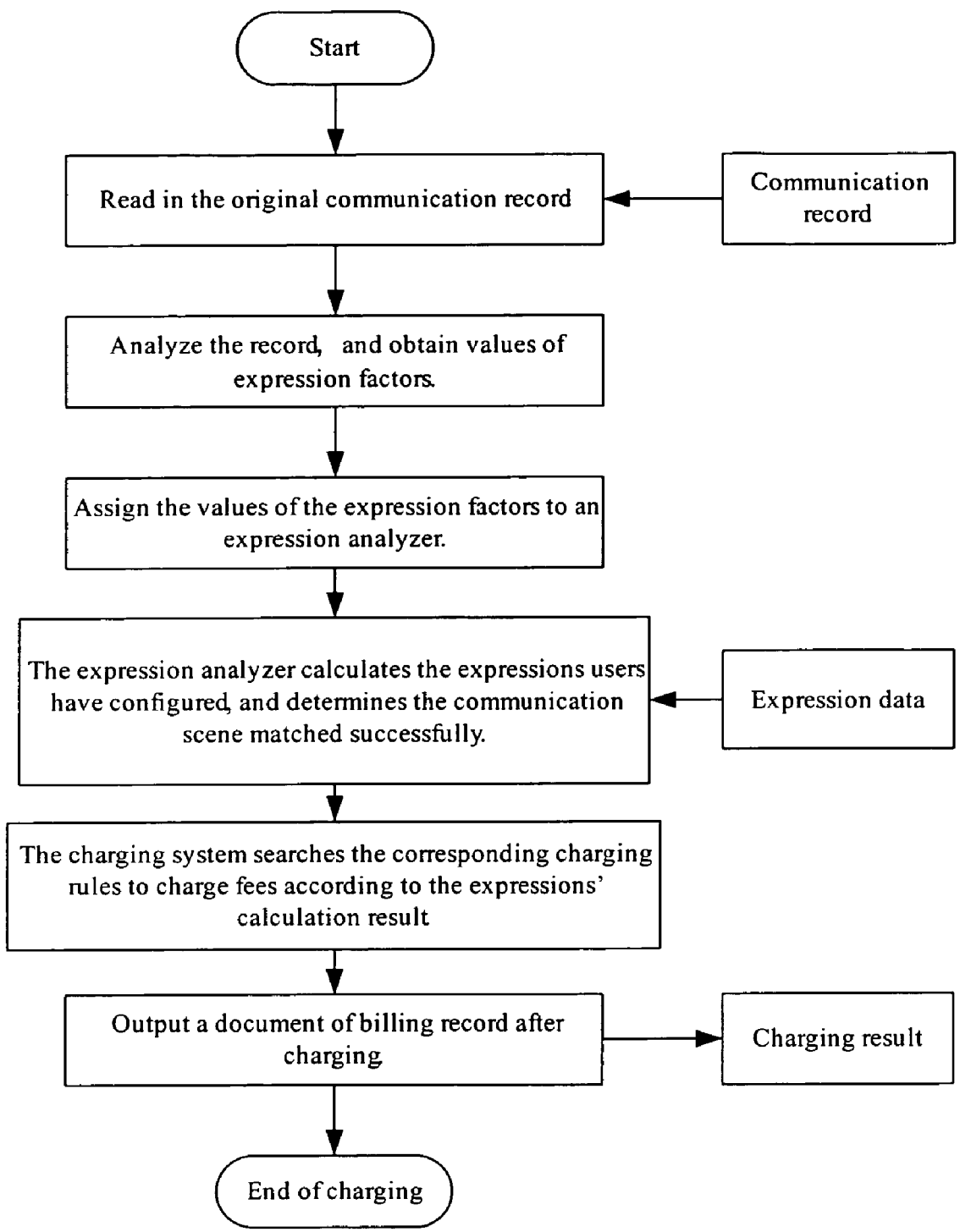
FIG. 3 is a flowchart for charging by using expressions in accordance with an embodiment of the invention.

The charging system matches communication scenes by using the configured expressions, calculates the fees of each communication, and outputs Call Detail Records (CDRs). FIG. 3 shows a flowchart for charging by using expressions, which includes:

1. The charging module of the charging system reads in the current communication record;

2. The charging module analyzes the communication record, and obtains the value of each factor defined in the expressions based on the communication record;

3. The charging module transfers the value of each factor to the expression analyzer;

4. Based on the configured expressions, the expression analyzer traverses the data of expressions pre-configured to make calculations, determines the expressions that have been successfully matched with each factor's value, and returns the matching result;

5. With the matching result from the expression analyzer, the charging module confirms the kind of communication scenes which the current communication belongs to, acquires the appropriate charging rules based on the confirmed communication scene, and charges according to the charging rules.

6. Output a file of CDRs, and terminate the current charging process.

For example, in a communication, the calling number is 075528780808, and the called number is 075528650400. After reading the communication record, the charging system analyzes the record and outputs the values of expression factors. The analysis result is that, VISIT_CODE (the area where this party user is located) is 8610 while OTHER_VISIT_CODE (the area where the opposite party user is located) is 8610. The charging system assigns the values of expression factors to the expression analyzer; the expression analyzer matches the configured expressions with the factor values assigned by the charging system and makes a conclusion that the expression of a local-network communication is TRUE. Thus, the charging system, based on the matching result from the analyzer, is able to search out the appropriate calculating rules and calculate the fees of the current CDRs.

Since an analytical approach of expressions is employed in this invention and the expressions are configured during the system's operation, it is easy for a user to modify the expressions, and it is possible to configure appropriate expressions for newly-added charging rules. Thereby, by means of expressions, setting charging rules and describing any kinds of communication scenes are more flexible.

In accordance with this invention, the descriptions of charging policies are unified, thereby the expansibility of the programs improved and the maintenance work simplified. Since the expressions conform to a pre-determined specific syntax rules and the expression factors provided are configured in advance, end users could configure expressions under a certain rule. As shown in the above examples, it is only possible for a user to combine the expression factors and operators given by the system to generate an expression. For example, as the charging system has given the factors of VISIT_CODE and OTHER_VISIT_CODE, the maintenance personnel can only describe a local communication by using these two factors, and the configuration of expressions is like a compiler for C language. As there are uniform rules, the meanings of the expressions could be known for all the users. Meanwhile it is the given factors that are used to support newly-added services. So the system maintenance is simplified, and the expansibility of the system is enhanced.

The invention claimed is:

1. A method for implementing charging communication services, comprising:

Step A: determining a plurality of expression factors related with charging, and configuring respectively corresponding expressions for charging rules which correspond to various communication scenes based on the expression factors;

Step B: reading a communication record corresponding to the communication scene, and obtaining the values of the expression factors by analyzing the communication record;

Step C: matching the values of the expression factors to the expressions corresponding to various charging rules, and obtaining an expression matching the values; and Step D: determining a charging rule corresponding to the expression obtained in Step C, and calculating the fees according to the charging rate corresponding to the charging rule.

2. The method according to claim 1, wherein, in Step A, determining a plurality of expression factors related with charging, comprises:

determining the expression factors based on the service type of the communication scene.

3. The method according to claim 1, wherein, the expression factors related with charging comprises at least one factor of:

calling number, called number, communication time, communication duration, home city of the calling, visited city of the calling, home city of the called, visited city of the called, home province of the calling, visited province of the calling, home province of the called, visited province of the called, home country of the calling, visited country of the calling, home country of the called, visited country of the called.

4. The method according to claim 1, wherein, in Step A, configuring respectively corresponding expressions for the charging rules, comprises:

configuring the expressions with the expression factors and operators in accordance with logical syntax rules.

5. The method according to claim 1, wherein, in Step A, configuring respectively corresponding expressions for the charging rules, comprises:

saving the expressions and the charging rules thereof in a way of one-to-one correspondence.

6. The method according to claim 1, wherein, Step C comprises:

assigning the values to each of the expressions corresponding to the charging rules, performing the operation of the expressions assigned with expression factors' values, and based on the operation result, determining the expressions, which satisfy the logical relationship after being calculated with the values of the expression factors, as the expressions matching to the expression factors' values.

7. The method according to claim 1, in Step D, calculating the fees according to the charging rule, further comprising: outputting a document of Call Detail Records (CDRs).

8. The method according to claim 1, further comprising: modifying expressions corresponding to the charging rules.

9. The method according to claim 1, further comprising: configuring new expressions for new charging rules.

10. The method according to claim 1, wherein, determining a plurality of expression factors related with charging, comprises: determining the expression factors in accordance with a uniform rule; and configuring respectively corresponding expressions, comprises: configuring respectively corresponding expressions in accordance with a uniform rule.

11. The method according to claim 2, wherein, the expression factors related with charging comprises at least one factor of:

calling number, called number, communication time, communication duration, home city of the calling, visited city of the calling, home city of the called, visited city of the called, home province of the calling, visited province of the calling, home province of the called, visited province of the called, home country of the calling, visited country of the calling, home country of the called, visited country of the called.

12. The method according to claim 4, wherein, in Step A, configuring respectively corresponding expressions for the charging rules, comprises:

saving the expressions and the charging rules thereof in a way of one-to-one correspondence.

13. A system for charging communication services, comprising at least a charging module for calculating fees based on the charging rate corresponding to a charging rule, and further comprising an expression analyzer, wherein:

the charging module is further configured to determine a plurality of the expression factors related with charging, and providing the expression factors for configuring expressions for various charging rules; the charging module is further configured to read a communication record, obtain the values of the expression factors by analyzing the communication record, and provide the values of the expression factors for the expression analyzer; and the expression analyzer is configured to acquire the corresponding expressions for various charging rules, determining the expression matching to the values of the expression factors obtained from the charging module, and returning the charging rule corresponding to the determined expression to the charging module.

* * * * *

UNITED STATES PATENT AND TRADEMARK OFFICE
CERTIFICATE OF CORRECTION

PATENT NO. : 7,606,356 B2  Page 1 of 1
APPLICATION NO. : 10/593763
DATED : October 20, 2009
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 538 days.

Signed and Sealed this

Twelfth Day of October, 2010

David J. Kappos
*Director of the United States Patent and Trademark Office*